A. CARTER.
SAND BLAST NOZZLE.
APPLICATION FILED JULY 20, 1911.
1,107,244.
Patented Aug. 11, 1914.
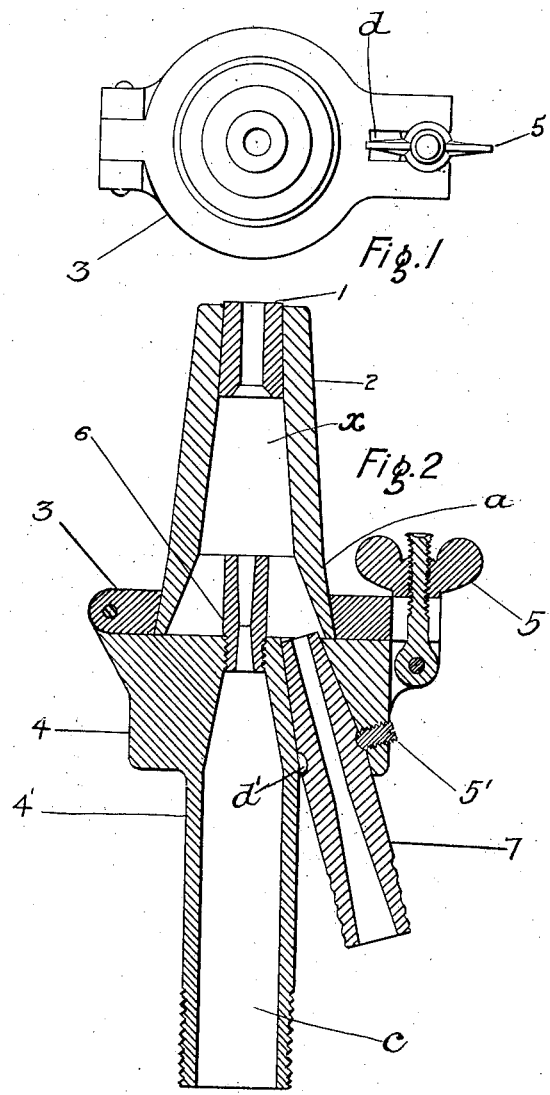
WITNESSES:
A. M. Valentine
C. J. Wyckoff
INVENTOR
Albert Carter
BY John H. Miller
his ATTORNEY

UNITED STATES PATENT OFFICE.

ALBERT CARTER, OF NEW YORK, N. Y., ASSIGNOR, BY DIRECT AND MESNE ASSIGNMENTS, TO CARTER METALS CLEANING COMPANY, A CORPORATION OF DELAWARE.

SAND-BLAST NOZZLE.

1,107,244.  Specification of Letters Patent.  Patented Aug. 11, 1914.

Application filed July 20, 1911. Serial No. 639,506.

*To all whom it may concern:*

Be it known that I, ALBERT CARTER, a citizen of the United States, residing in New York city, county and State of New York, have invented new and useful Improvements in Sand-Blast Nozzles, of which the following is a specification.

This invention relates to apparatus for sand blasting and has for its particular objects, the provision of an effective and durable, yet simple construction of a nozzle which is capable of serving to effect the pneumatic propulsion of a jet of sand against the surface or object on which it is desired to cause the same to impinge.

The invention is fully set forth and described in the following specification and drawings forming a part thereof, in which—

Figure 1 is an end elevation of my improved nozzle and Fig. 2 is a vertical, central, longitudinal section of the same.

Referring to the construction of the apparatus shown in the drawings, the reference numeral 1 designates the tip through which the commingled air and sand are intended to issue in their passage to the surface to be treated. The said tip slidably fits within a mixing cone 2, which as shown is provided with walls which converge toward the tip and thereby serve to snugly receive the said tip when the same is introduced therein, and forced into the outermost end of said mixing cone so that, as shown in Fig. 2, the end of said tip will slightly protrude beyond the end of said cone. Said cone 2 is elongated as shown, and is flared at its inner end $a$ in such a manner that the same is adapted to be removably fitted within a retaining ring 3 pivotally mounted upon a shoulder 4 of the casting 4', which is optionally locked in the position shown in the drawings by means of a thumb screw 5, the latter being also pivoted in order that it may be optionally caused to enter a slot $d$ formed in the free end of said ring. It is evident that the said ring may be readily locked into the position shown in said drawings, by merely forcing the said thumb screw into a horizontal position and then threading the said nut of said thumb screw upon its shank until the said nut is in forcible contact with the portion of said ring adjacent the edges of the groove. When the shank of said thumb screw is swung outwardly, it is evident that it will be removed from said groove, and the ring may then be swung into a suitable position so that if desired the said mixing cone 2 can be removed therefrom, and in turn the tip 1 can be removed from the mixing cone. Since a mixing cone when employed with air pressures of 100 pounds per square inch lasts but two weeks approximately, and since it is necessary to renew the tip every one-quarter or half an hour in many instances, it is apparent that this means for the ready release of the ring in order to provide means for the renewal of the mixing cone and the tip is of no little importance. The said casting 4' is provided with an air conduit $c$ and intended to be connected by means of a suitable hose threaded upon its outer end with an air reservoir. The inner end of said conduit is of reduced cross section and is provided with a thread adapted to receive a high velocity turbine jet 6. The latter as shown is of greatest cross sectional area at its respective ends, the same approximating in practice about one-quarter of an inch, and is of slightly less cross sectional area at a point approximately three-fifths of the distance from its flare end, said area preferably in practice being $\frac{3}{16}$ inch. By the application of this high velocity turbine jet to the sand blast apparatus, I am enabled to greatly increase the efficiency of the same and procure a decreased supply of sand through the outlet with a much smaller pressure at the reservoir than is ordinarily required for the air as it passes through said jet at a much higher velocity, owing to the reduced skin friction afforded by the walls of said jet, and in accordance with well known physical law.

In order to supply sand into the flaring end of the mixing cone, a hollow sleeve 7 is provided, the bore of which diverges from the middle toward its outer or free end, and the inner end of said sleeve lies in snug engagement with the converging wall of the conduit $c$. Said sleeve is provided with an annular groove $d'$ which is adapted to receive a locking screw 5', whereby the ready removal of said sleeve is permitted. In actual operation the renewal of said sleeve every two days is required, and accordingly it is important that proper means for rigidly securing the same to said casting should be provided, which means shall at the same time permit of the ready removal when desired of said sleeve. The outer or free end of the sleeve is provided with grooves for the reception of a hose in order that the same may be secured to a sand reservoir.

Heretofore many attempts have been made to produce an efficient construction for the application of a blast of sand to stone or metal or the like, but in each case so far as I am aware, the efficiency has been greatly impaired owing to the impedance of the air or sand either in its passage to the mixing reservoir, or while escaping therefrom with the consequence that not only did the apparatus rapidly deteriorate in use, but the efficiency was so seriously impaired as to cause considerable annoyance and trouble. The admission of the air to the reservoir $x$ by means of the high velocity turbine jet is on exactly the same principle with the admission of steam to the blades of the turbine wheel, since air is a fluid and the laws relating to gases apply the same to this fluid as to high pressure steam. The tip of the nozzle when the same is being actually employed is eroded to the greatest extent at its outermost end and the innermost end up to about one-third of its entire length is eroded to the least extent, contrary to expectations. As a matter of fact the action of the sand is so violent that not only does serious erosion occur if any obstructions are offered to it in its passage from the tip of the sand inlet sleeve 7 or to the mixing reservoir and passing out through the tip 1, but the action seems to occur at the most unexpected places. For this reason it is highly important that a construction similar to that herein described be provided.

Having thus described my invention, what I claim as new and desire to secure by Letters Patent is:—

1. In a sand-blast nozzle the combination comprising a casing consisting of two sections pivotally secured together, one of said sections being provided with a longitudinal air-supply conduit, said air supply conduit having a high-velocity turbine outlet jet, the bore of which consists of two truncated cones united at their smallest ends, an axially extending tip secured at the innermost end of said conduit and an oblique conduit removably secured to said section and eccentrically disposed with respect to said longitudinal conduit, and the other of said sections being provided with a reservoir, said reservoir having an outlet opening provided with a removable tip oppositely disposed with respect to, and in alinement with the longitudinal axis of that portion of said air-supply conduit immediately adjacent said tip, and means for optionally securing said sections together.

2. In a sand-blast nozzle the combination comprising a casing provided with an air-supply conduit, said air-supply conduit having a high-velocity turbine outlet jet, the bore of which consists of two truncated cones united at their smallest end, and a reservoir provided in said casing in communication with said conduit through said outlet jet, said reservoir being provided with a supplemental sand supply conduit and a mixture outlet.

3. In a sand-blast nozzle the combination comprising an air-conduit, provided with an outlet consisting of a high-velocity turbine jet having a converging bore immediately adjacent to a diverging bore whereby the passage of fluid therethrough is accelerated and friction of fluid passing therethrough is minimized.

4. In a sand-blast nozzle the combination comprising a casing consisting of two sections removably secured together, one of said sections being provided with an air-supply conduit, and the other of said sections being provided with a reservoir, means consisting of a high-velocity turbine jet of minimum cross sectional area at a point intermediate its ends and of maximum cross sectional area at its respective ends, for supplying air from said conduit to said reservoir, and means for permitting of the escape of a mixture of air and sand from said reservoir, and separate means for admitting sand to said reservoir.

5. A sand-blast nozzle, having a casing consisting of two abutting sections pivotally secured together, one of said sections being provided with a central longitudinal air-supply conduit, a high velocity turbine jet secured to the innermost end of said conduit and extending in axial alinement therewith, and an oblique conduit removably secured to said section, adjacent said longitudinal air-conduit, locking means, out of alinement with said sleeve and extending at an angle to the axis thereof, independently movable with respect to said sleeve and said section, the other of said sections being provided with a reservoir, said reservoir having an outlet opening provided with a removable tip oppositely disposed with respect to, and in alinement with, the longitudinal axis of that portion of said air-supply conduit adjacent the tip on its inner end, and locking means independently movable with respect to both of said sections for securing the same together.

In witness whereof I have hereunto set my hand at the city of New York, this 18th day of July, 1911.

ALBERT CARTER.

Witnesses:
JOHN H. MILLER,
N. D. SWENARTON.